Oct. 15, 1929.   G. L. REEVES   1,731,827
DRIVING BELT
Filed Oct. 26, 1925
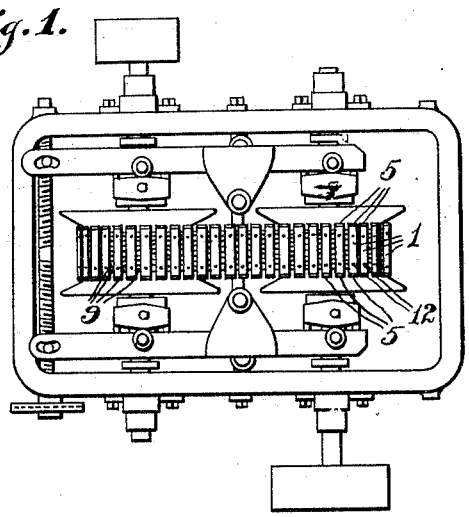
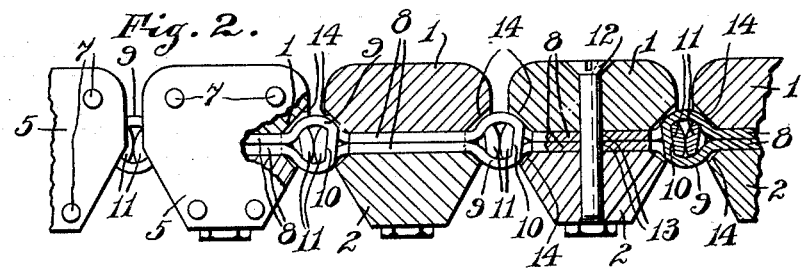
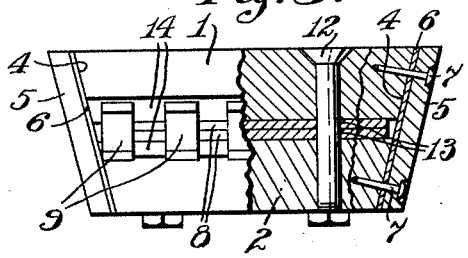
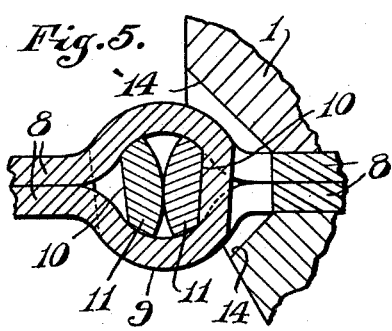
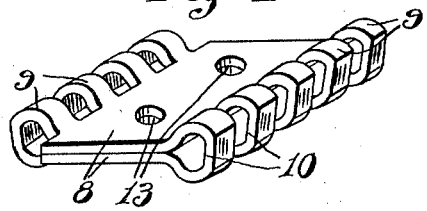
INVENTOR.
Gurney L. Reeves,
BY
Hood + Hahn
ATTORNEYS Patented Oct. 15, 1929

1,731,827

UNITED STATES PATENT OFFICE

GURNEY L. REEVES, OF COLUMBUS, INDIANA, ASSIGNOR TO REEVES PULLEY COMPANY, OF COLUMBUS, INDIANA, A CORPORATION OF INDIANA

DRIVING BELT

Application filed October 26, 1925. Serial No. 64,837.

My invention relates to improvements in driving belts particularly adapted for that type of transmission commonly known in the market for many years as the "Reeves" type wherein the driving force is delivered from the driving shaft to the driven shaft through the medium of two pairs of cone discs and an intermediate driving belt effective along its edges. In this type of belt there is usually provided a series of transverse bars having inclined ends adapted to make friction engagement with the faces of the cone pulleys. These bars are usually connected to a flexible endless band.

It is one of the objects of the present invention to provide a driving belt wherein each bar is provided with a connector means adapted to be connected to the next adjacent bar to form a series of links.

For the purpose of disclosing my invention I have illustrated in the accompanying drawing one embodiment thereof and in said drawings.

Fig. 1 is a plan view of the type of transmission with which my driving belt is particularly applicable;

Fig. 2 is a side elevation partly in section of a section of my driving belt;

Fig. 3 is a side elevation partly in section of one of the links;

Fig. 4 is a perspective view of the connector means, and

Fig. 5 is a detail section of the connection.

In the embodiment illustrated each of the links comprises a cross bar formed in upper and lower sections 1 and 2 the end faces of which are tapered as at 4 and have secured thereto leather facings 5 backed by metal backing members 6. The facing and backing members are held in position by counter-sunk brads or nails 7. Secured between the upper and lower sections 1 and 2 is a connector comprising a pair of plates 8 having extending from the opposite ends thereof a series of loop fingers 9 spaced apart to interdigitate with the adjacent fingers of the next succeeding links. These loops are mostly circular in form but are flattened as at 10 the construction being such that the flattened portion 10 of the two interdigitating series of loops will lie upon opposite sides of the common axes of the loops of two sets of fingers. Two rocker pins 11, 11 are projected through the loops with their curved faces in contact with each other and their flattened bases seated respectively upon the flattened portions 10 of the appropriate series of fingers thus forming a rocking connection between the two interdigitated series of fingers.

The sections 1 and 2 are clamped together with the flattened plate portion 8 between the same by bolts 12 which pass through the sections 1 and 2 and through openings 13 in the plate portions of the connectors. The edges of the meeting faces of the sections 1 and 2 are chamfered off at 14 to accommodate the loops 9 so that the cross bars may be connected as closely together as possible.

I claim as my invention:

1. A drive belt formed of a plurality of links each link comprising a flat plate having a plurality of extended loop interdigitating fingers, the ends of said loops being flattened, cross bars comprising upper and lower sections having inclined friction end faces, means clamping the upper and lower sections of the cross bars together upon opposite sides of said plates, and pairs of rocker pins passing through the loops of the adjacent interdigitating fingers, each having a flattened side bearing against the flattened ends of the loops, for connecting the links together.

2. A drive belt formed of a plurality of links each link comprising a flat plate having a series of extended spaced apart interdigitating loop fingers, the ends of said loop fingers being flattened, cross bars formed in upper and lower sections having inclined end faces, friction facing members secured to the opposite ends of said cross bars and extending the full length of the face, means for clamping said cross bars together and upon the plate, and pairs of rocking pins passing through the interdigitating loop fingers of adjacent links for connecting the same together, one side of each of said pins being flattened and bearing against the flattened ends of the loops.

3. A drive belt formed of a plurality of links each comprising a pair of top and bottom flat plates the opposite ends of which are connected by a series of integral spaced apart interdigitating loop fingers spread to receive rocking pins passing therethrough and cross bars having inclined end faces and formed in upper and lower sections between which said plates are clamped.

In witness whereof, I GURNEY L. REEVES, have hereunto set my hand at Columbus, Indiana, this 22nd day of October, A. D. one thousand nine hundred and twenty-five

GURNEY L. REEVES.